United States Patent
Liao

(10) Patent No.: US 6,474,585 B2
(45) Date of Patent: Nov. 5, 2002

(54) WIRE WINDING BOX WITH INCREASING USABLE AREA

(76) Inventor: Sheng-Hsin Liao, No.10, Alley 38, Lane 229, San Chun St., Shulin, Taipei Hsien (TW)

( * ) Notice: Subject to any disclaimer, the term of this patent is extended or adjusted under 35 U.S.C. 154(b) by 37 days.

(21) Appl. No.: 09/754,057

(22) Filed: Jan. 5, 2001

(65) Prior Publication Data

US 2002/0088891 A1 Jul. 11, 2002

(51) Int. Cl.[7] .............................................. B65H 75/48
(52) U.S. Cl. .............................. 242/378.1; 242/381.3; 242/385.3; 191/12.2 R
(58) Field of Search .......................... 242/378.1, 378.2, 242/378.3, 381.3, 385.3; 191/12 R, 12.2 R, 12.4; 439/501

(56) References Cited

U.S. PATENT DOCUMENTS

| | | | | |
|---|---|---|---|---|
| 2,514,628 A | * | 7/1950 | Cortes | 242/378.3 |
| 2,526,256 A | * | 10/1950 | Mihara | 242/381.3 |
| 3,695,544 A | * | 10/1972 | Morey | 242/378.2 |
| 5,094,396 A | * | 3/1992 | Burke | 242/378.2 |
| 5,544,836 A | * | 8/1996 | Pera | 242/378.1 |
| 5,588,626 A | * | 12/1996 | Yang | 242/378.1 |
| 5,684,883 A | * | 11/1997 | Chen | 439/501 |
| 5,797,558 A | * | 8/1998 | Peterson et al. | 242/378.2 |

* cited by examiner

Primary Examiner—John M. Jillions

(57) ABSTRACT

A wire winding box with an increasing area includes a box body, a communication wire, a wire winding disk, and a spiral spring. The box body has a wire groove and a shaft. The wire winding disk has a first disk body. Two surfaces of the first disk body are installed with a receiving groove and a wire winding ring. The wire winding disk is placed in the receiving space of the box body. The wire winding disk is pivotally installed to the shaft through an axial hole. The communication wire is installed in the receiving groove and out of the wire winding shaft at two surfaces of the first disk body.

7 Claims, 10 Drawing Sheets

WIRE WINDING BOX WITH INCREASING USABLE AREA

FIELD OF THE INVENTION

The present invention relates to a wire winding box with an increasing usable area, and especially to a wire winding box with a communication wire which can be rewound automatically and having a large area for receiving a longer communication wire.

BACKGROUND OF THE INVENTION

Currently, computers, modems, telephones, or facsimile machines are arranged with communication wires for connection to other devices or networks to achieve their objective. In order to avoid an overlong communication wire that can wind around objects, or an overshort communication wire, various wire winding boxes have been developed. Such a wire winding box basically includes a box body, a communication wire, a wire winding disk, and a spiral spring. The receptacle of the communication wire is inserted into the receptacle of a communication device for downloading data.

However, in the prior art wire winding box, as the communication wire is wound around the wire winding disk, it is confined by the space of the wire winding disk. Furthermore, the segments of the communication wire in the outer portion and inner portion of the wire winding ring are proportional. As the area of the wire winding box is finite, a longer communication wire cannot be received therein, so that the use of the wire winding box is confined.

Furthermore, the communication wire of the prior art wire winding box is easy to bend as it is being wound into the box, and thus the wire is easily broken or destroyed, so as to deteriorate the transmission quality of the signals it carries.

Therefore, it is appreciated that the prior art wire winding box has some defects that are necessary to improve.

SUMMARY OF THE INVENTION

Accordingly, the primary object of the present invention is to provide a wire winding box with an increased usable area, wherein a communication wire winds around a receiving groove and wire winding shafts at two surfaces of the wire winding disk, the receiving groove and the wire winding shaft are alternatively arranged not to affect one another. When the communication wire winds around the wire winding disk, it is not confined by the space of the wire winding disk so that the usable area of the wire winding box is increased greatly and thus more communication wire can be received therein. Consequently, the wire winding box is more convenient and easy to use.

Another object of the present invention is to provide a wire winding box with an increased area, wherein as the communication wire winds in the wire winding box, no bending occurs, so as to avoid the breakage and destruction of the communication wire that would deteriorate the quality of communications therewith.

To achieve these objects, the present invention provides a wire winding box with an increased area, including a box body, a communication wire, a wire winding disk, and a spiral spring. The box body has a receiving space and a shaft. The shaft is installed at an inner lateral side of the receiving space. A wire winding disk has a first disk body and a second disk body. The first and second disk bodies have axial holes. A receiving groove is disposed between the first and second disk bodies and a wire winding ring or shaft extends from the first disk body. The wire winding disks placed in the receiving space in the box body, and the axial holes are disposed on the shaft. A communication wire is wound within the receiving groove of the wire winding disk. The communication wire is further wound on the wire winding shaft of the wire winding disk. A spiral spring is connected between the box body and the wire winding disk. Thereby, a wire winding box with an increased area is formed.

The various objects and advantages of the present invention will be more readily understood from the following detailed description when read in conjunction with the appended drawings.

DETAILED DESCRIPTION OF THE PREFERRED EMBODIMENTS

Figure 1:
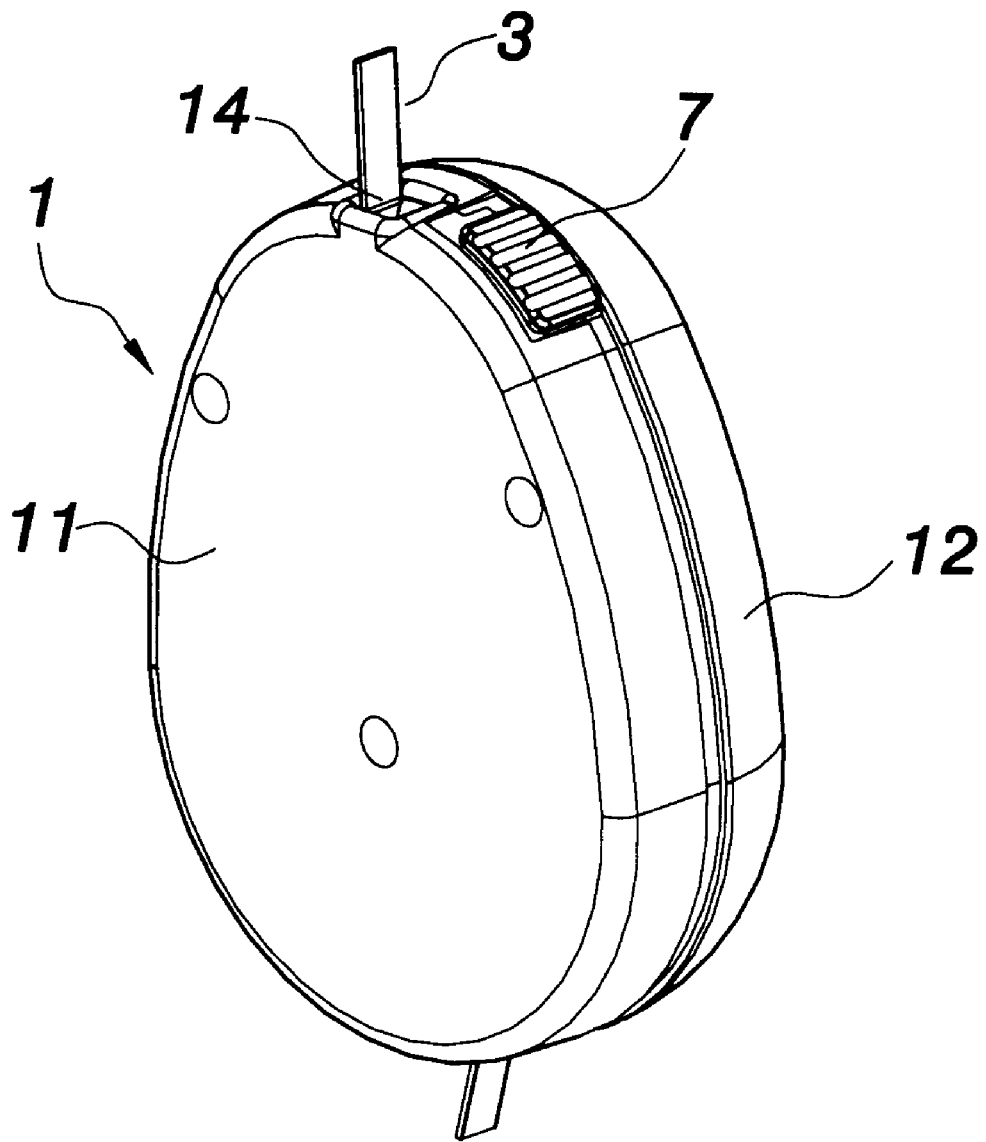
FIG. 1 is a perspective view of the first embodiment of the present invention.
Figure 2:
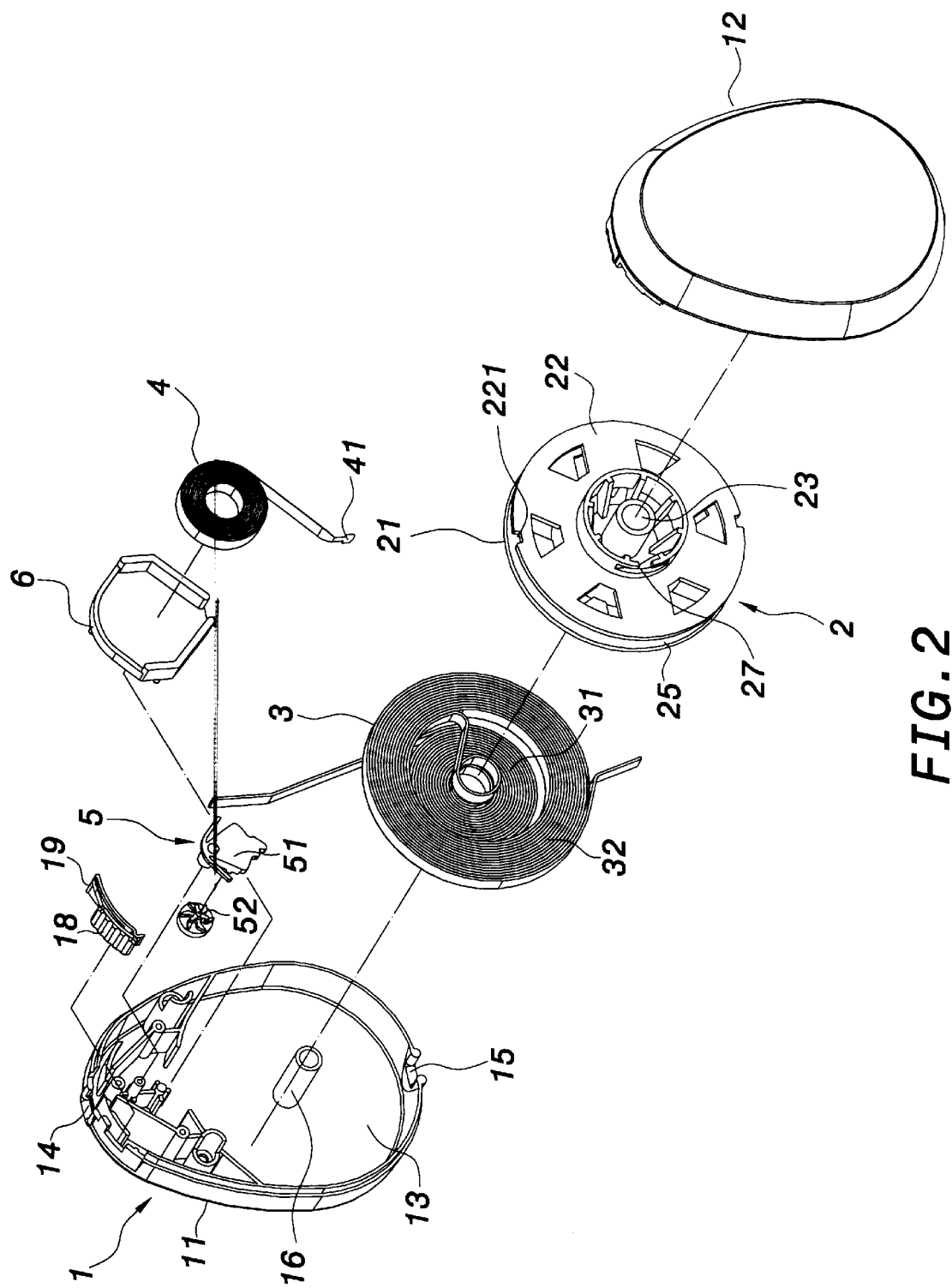
FIG. 2 is an exploded perspective view of the first embodiment of the present invention.
Figure 3:
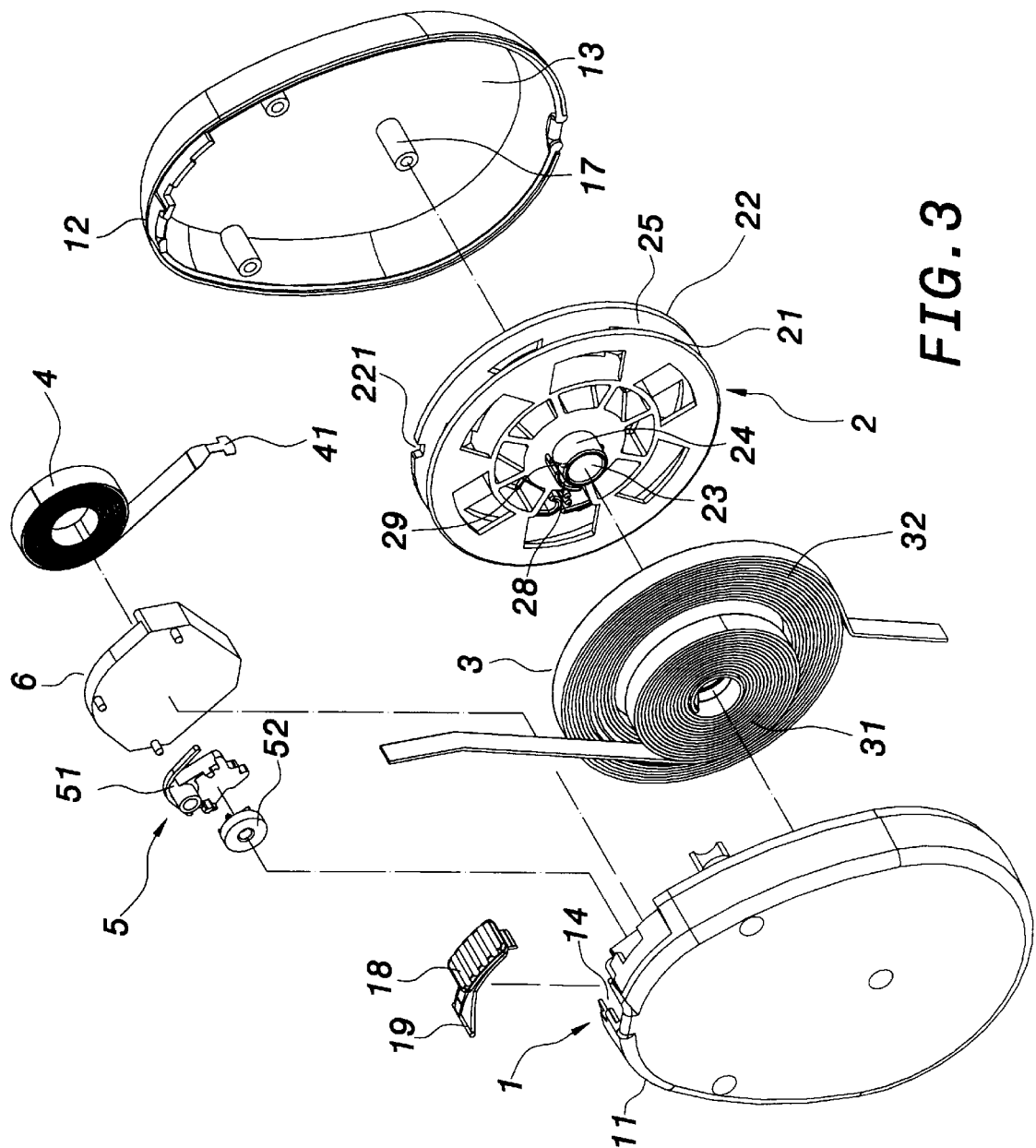
FIG. 3 is another exploded perspective view of the first embodiment of the present invention, viewed from another angle.
Figure 4:
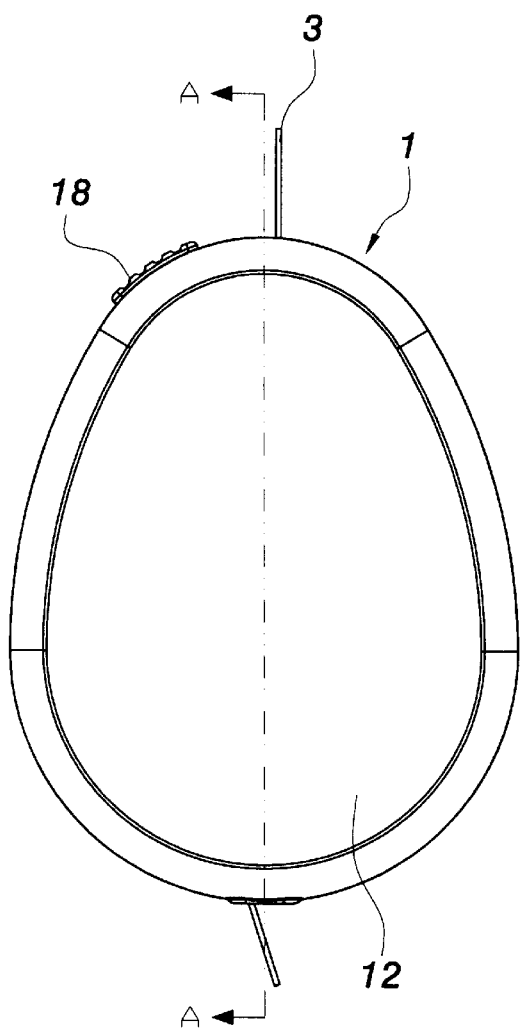
FIG. 4 is a plan view of the first embodiment of the present invention.
Figure 5:
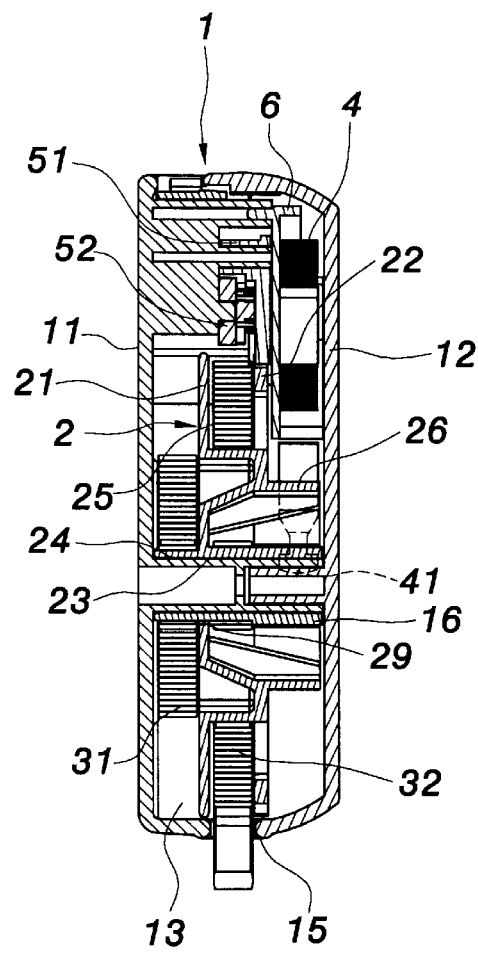
FIG. 5 is a cross-sectional view along line A—A of FIG. 4.

Referring to FIGS. 1 to 5, a preferred embodiment of the present invention directed to a wire winding box for increasing the usable area therein, is illustrated. The related components in the present invention include a wire winding box body 1, a wire winding disk 2, a communication wire 3, and a spiral spring 4.

The box body 1 of the wire winding box is a hollow casing formed by buckling or screwingly engaging a first half casing 11 and a second half casing 12. The interior of the box body 1 is formed with a receiving space 13 for receiving the communication wire 3, the wire winding disk 2, and the spiral spring 4 therein. The edge of the receiving space 13 is installed with a first wire hole 14 for passing one end of the communication wire 3 therethrough, and a second wire hole 15 is formed therein for passing another end of the communication wire 3 therethrough. The inner lateral side of the receiving space 13 is installed with a hollow shaft 16, and the opposite side is installed with a sleeve 17 for being inserted on one end of the hollow shaft 16.

Figure 6:
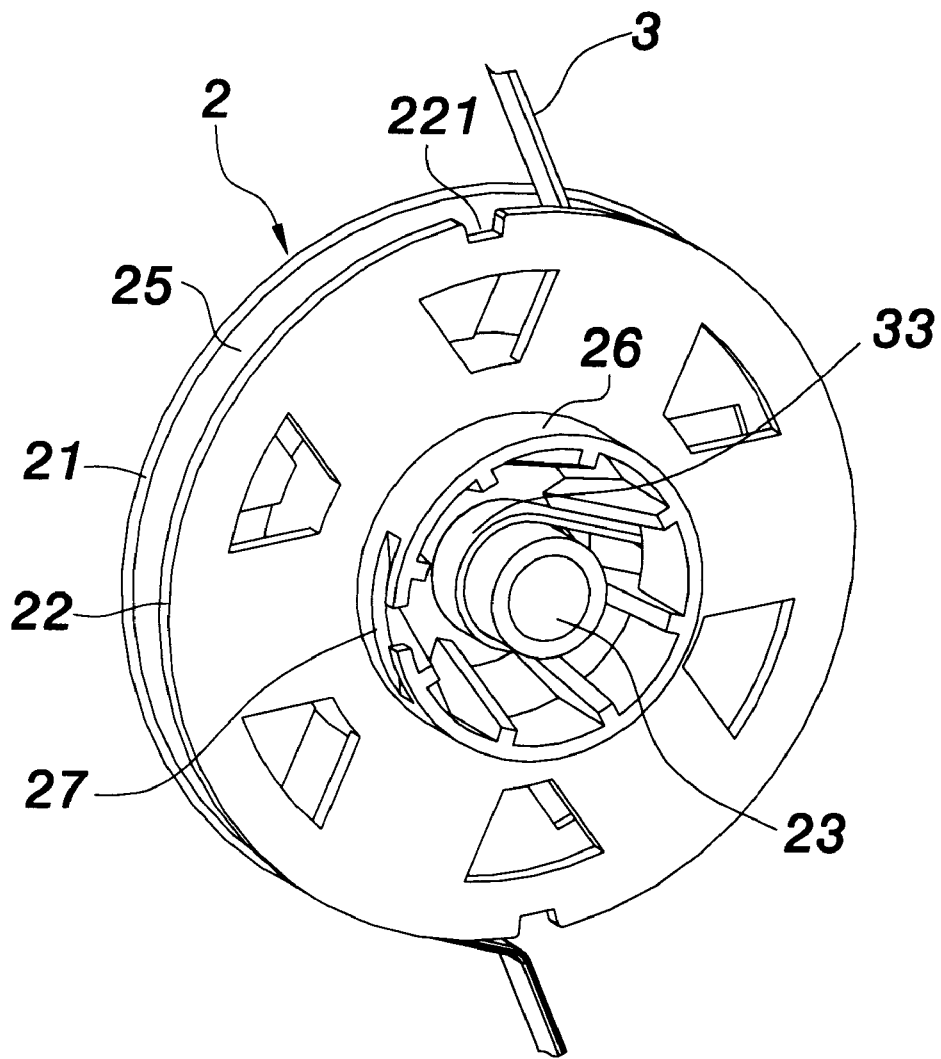
FIG. 6 is a perspective view of the wire winding disk of the first embodiment of the present invention.

The wire winding disk 2 is formed by a first disk body 21 and a second disk body 22 (referring additionally to FIG. 6).

The two disk bodies 21, 22 are formed integrally or buckled together. Each of the disk bodies 21 and 22 are formed with a central axial hole 23. The first disk body 21 is formed with a hollow wire winding shaft or ring 24 and a receiving groove 25. The receiving groove 25 is positioned between the two disk bodies 21 and 22. A periphery of the bottom of the wire winding shaft 24 is installed with at least one positioning unit 28. The positioning unit 28 has a cambered-like shape or a cylindrical shape. A through hole 29 is formed on first disk body 21. The through hole 29 penetrates through two surfaces of the first disk body 21. The second disk body 22 is installed with an elastic retainer 26. The elastic retainer 26 has a buckling hole 27. The wire winding disk 2 is received in the receiving space 13 of the box body 1. Moreover, the wire winding disk 2 is pivotally installed in the shaft 16 so that the wire winding disk 2 may be rotatably installed in the receiving space 13.

Each of two ends of the communication wire 3 are connected to a plug or an earphone (not shown). The communication wire 3 is wound around the wire winding shaft 24 so as to be installed as an inner coiled portion 31. Another end of the communication wire 3 passes through the through hole 29 in the first disk body 21 of the wire winding disk 2, and then winds therearound so as to be formed as a helical connecting portion 33. Then, the communication wire 3 is wound within the receiving groove 25 so as to form an outer coiled portion 32. Therefore, the communication wire 3 is wound on the wire winding shaft 24 and in the receiving groove 25, at the two surfaces of the first disk body 21. The communication wire 3 passes through the portion between the positioning unit 28 and the wire winding shaft 24 so that the communication wire 3 is clamped and positioned therein without being moved by a pulling force. Two ends of the communication wire 3 respectively extend from the first wire hole 14 and second wire hole 15 of the box body 1.

The spiral spring 4 is positioned in the receiving space 13 of the box body 1. A buckling end 41 of the spiral spring 4 is buckled to the buckling hole 27 of the wire winding disk 2 so that the spiral spring 4 is connected to the wire winding disk 2. As the wire winding disk 2 rotates, the spiral spring 4 stores dynamic energy.

By the aforesaid arrangement, a wire winding box as illustrated in FIG. 1 is formed. In practical application, the wire winding box can be used to wind and receive the communication wire 3 with a certain length and moreover, the communication wire 3 may be rewound. The user may insert a lug (not shown) connected to the communication wire 3 into the receptacle of a communication device for transmission of data. Two ends of the communication wire 3 can be pulled out directly from the wire winding box. Two ends of the communication wire 3 are subjected to the action of the spiral spring 4, so as to be subject to a pulling force. Therefore, the wire can be rewound into the box successfully without any segment of wire being exposed.

Furthermore, the receiving space 13 of the box body 1 is installed with a supporting seat 6 so that the spiral spring 4 can be received between the seat and the wall of the casing of the box body 1. In order to avoid the effect of the tension as the communication wire 3 is pulled out, a plurality of buckling grooves 221 are installed at a periphery of the second disk body 22 of the wire winding disk 2. A reciprocal-moving controlling device 5 is installed adjacent to the wire winding disk 2. The reciprocal-moving controlling device 5 includes a freely swingable piece 51 and a freely rotatable ratchet 52. By the special interaction between the swingable piece 51, ratchet 52, and the buckle groove 221 of the wire winding disk 2, the communication wire 3 can be pulled reciprocally so as to be fixed or rewound.

Figure 8:
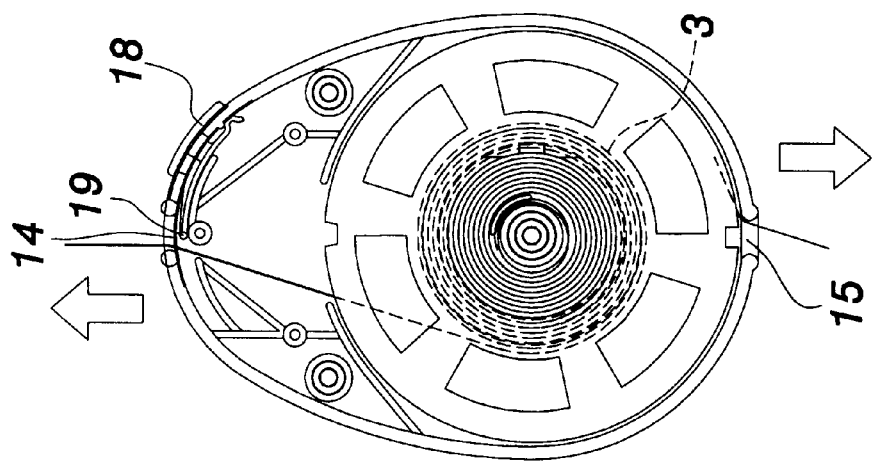
FIG. 8 is another schematic view showing the operation of the first embodiment of the present invention.
Figure 7:
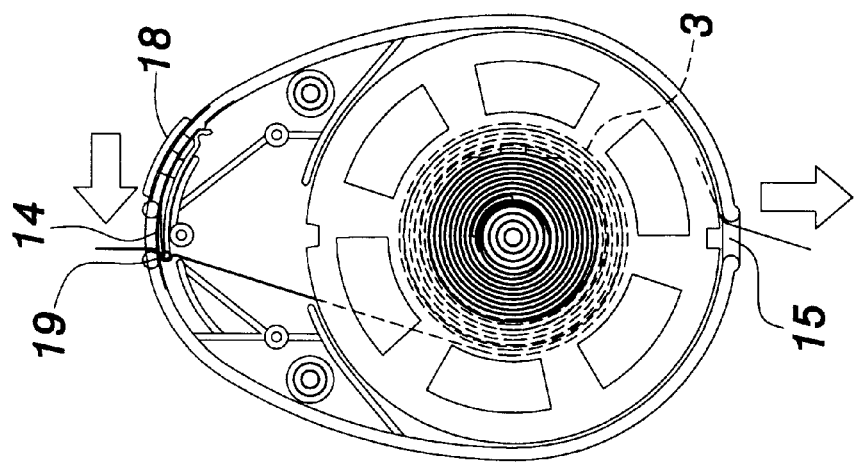
FIG. 7 is a schematic view showing the operation of the first embodiment of the present invention.

Moreover, a buckling button 18 is installed adjacent the first wire hole 14 of the box body 1. The buckling button 18 has a buckling portion 19 on one end thereof. The buckling button 18 is slidably mounted to the side of the box body 1. When the buckling button 18 is pushed toward the first wire hole 14, the buckling portion 19 will abut against the communication wire 3 so as to buckle the communication wire 3. Therefore, one end of the communication wire 3 is buckled and thus cannot be pulled. Only the other end of the communication wire 3 can be pulled, and therefore, only one end of the wire 3 is pulled out from the wire winding box (referring to FIG. 7). When the buckling button 18 is pushed in an opposite direction, the buckling portion 19 is released from the communication wire 3 so that the communication wire 3 is also released. As a result, two ends of the communication wire 3 can be pulled (referring to FIG. 8). Furthermore, the buckling button 18 is capable of being fixed to an edge of the box body 1, so that the buckling portion 19 of the buckling button 18 serves to fix the communication wire 3.

In the present invention, the communication wire 3 is installed in the receiving grooves 25 and around the wire winding shaft 24, at two surfaces of the first disk body 21. Therefore, as the communication wire 3 winds around the wire winding disk 2, the inner coiled portion 31 and outer coiled portion 32 are alternatively arranged so as not to affect one another. When the communication wire 3 winds around the wire winding disk 2, it is not confined by just the space of the receiving groove of the wire winding disk 2, so that the usable area of the wire winding box is increased greatly, and thus more communication wire 3 can be received therein. Consequently, the wire winding box is used conveniently and easily.

Furthermore, in the present invention, the inner coiled portion 31 and outer coiled portion 32 of the communication wire 3 are alternatively arranged, and the helical connecting portion 33 is installed between the inner coiled potion 31 and the outer coiled portion 32. Therefore, as the communication wire 3 winds in the wire winding box, no bending occurs, so breakage and damage to the communication wire 3 that would deteriorate the quality of communication is avoided.

Figure 9:
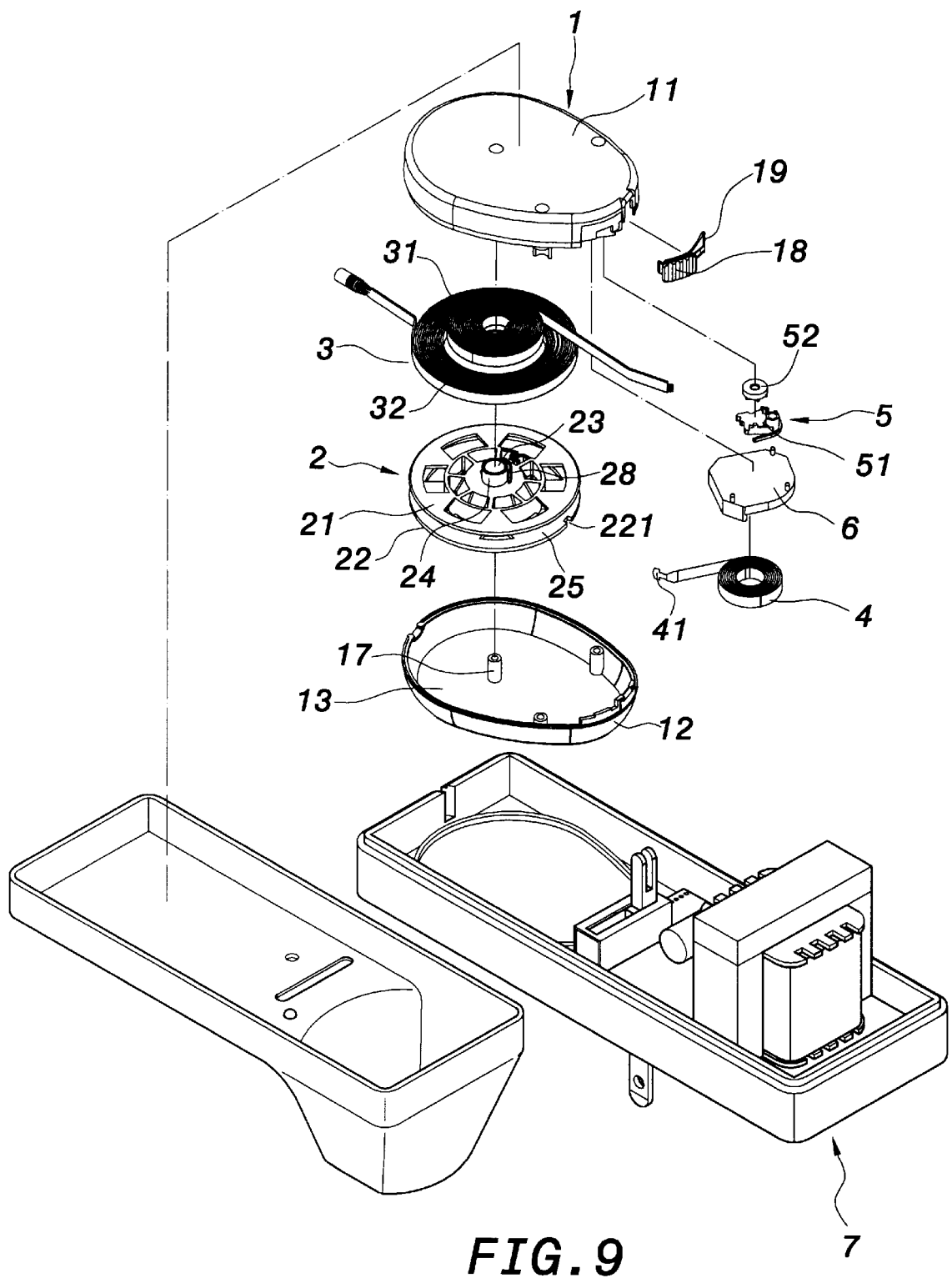
FIG. 9 is an exploded perspective view of a second embodiment of the present invention.
Figure 9A:
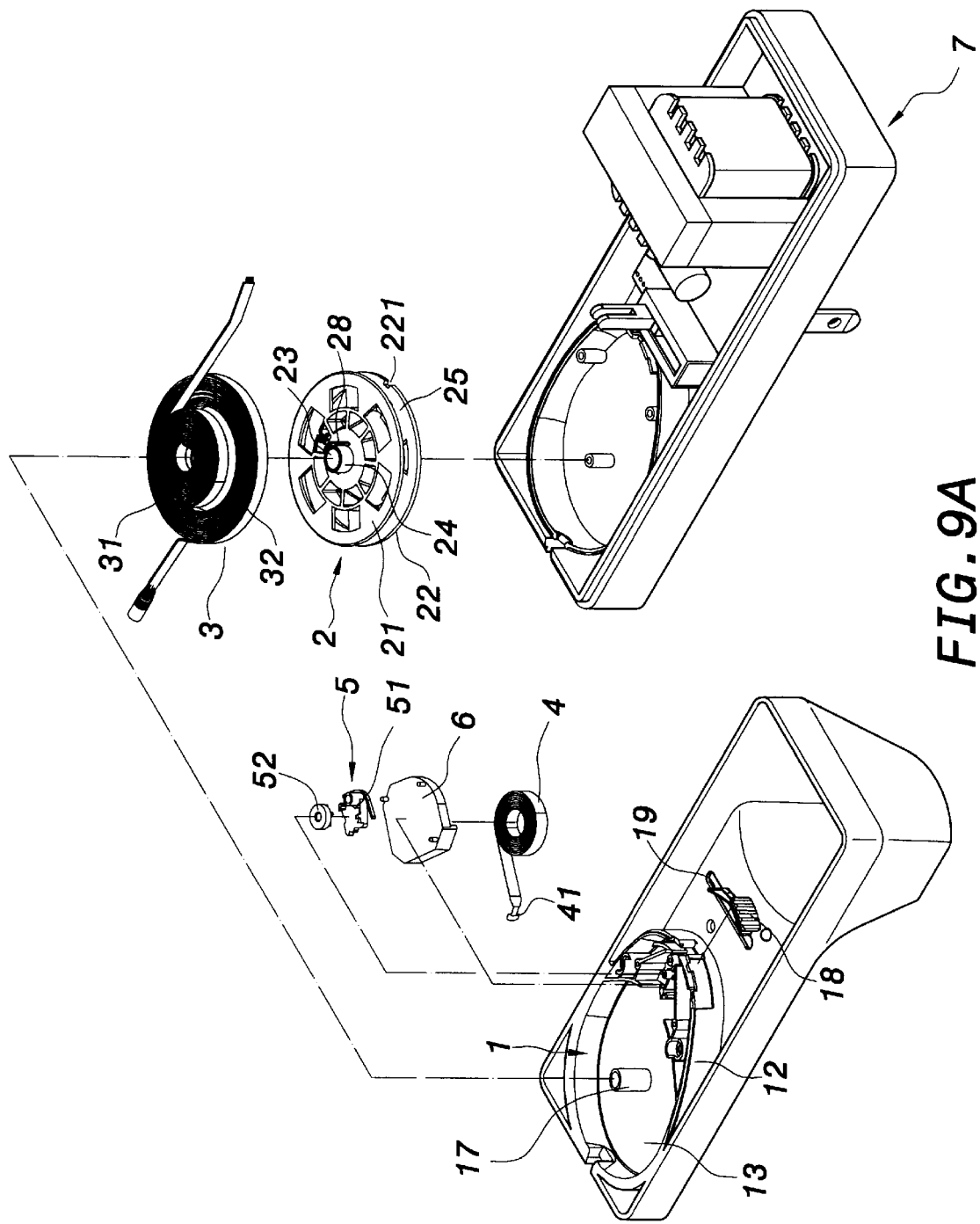
FIG. 9A is an exploded perspective view of a third embodiment in the present invention.
Figure 10:
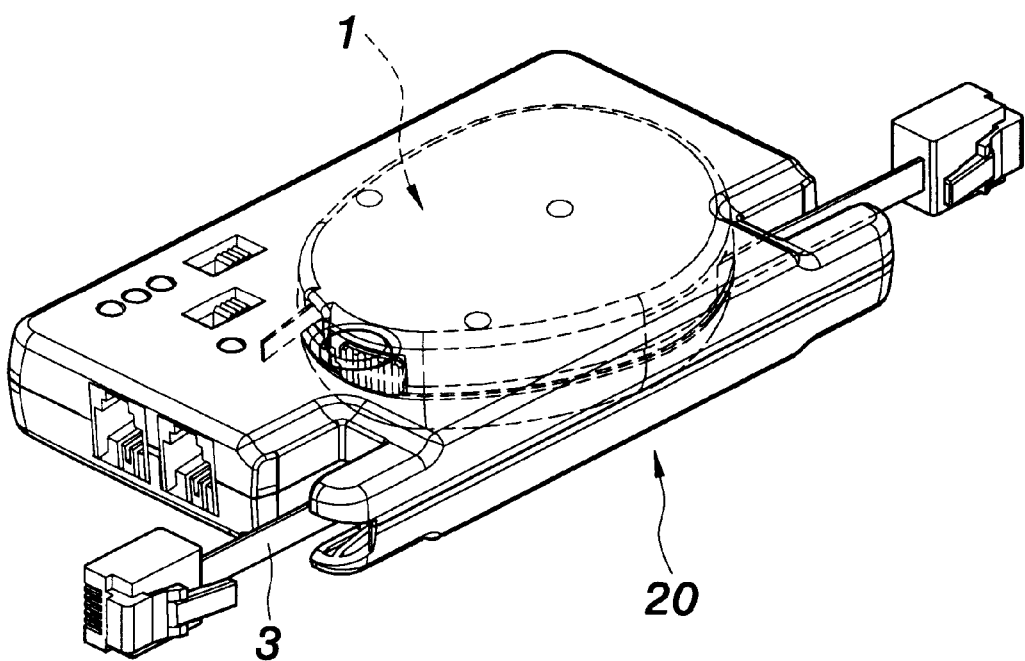
FIG. 10 is an assembled perspective view of a fourth embodiment of the present invention.
Figure 11:
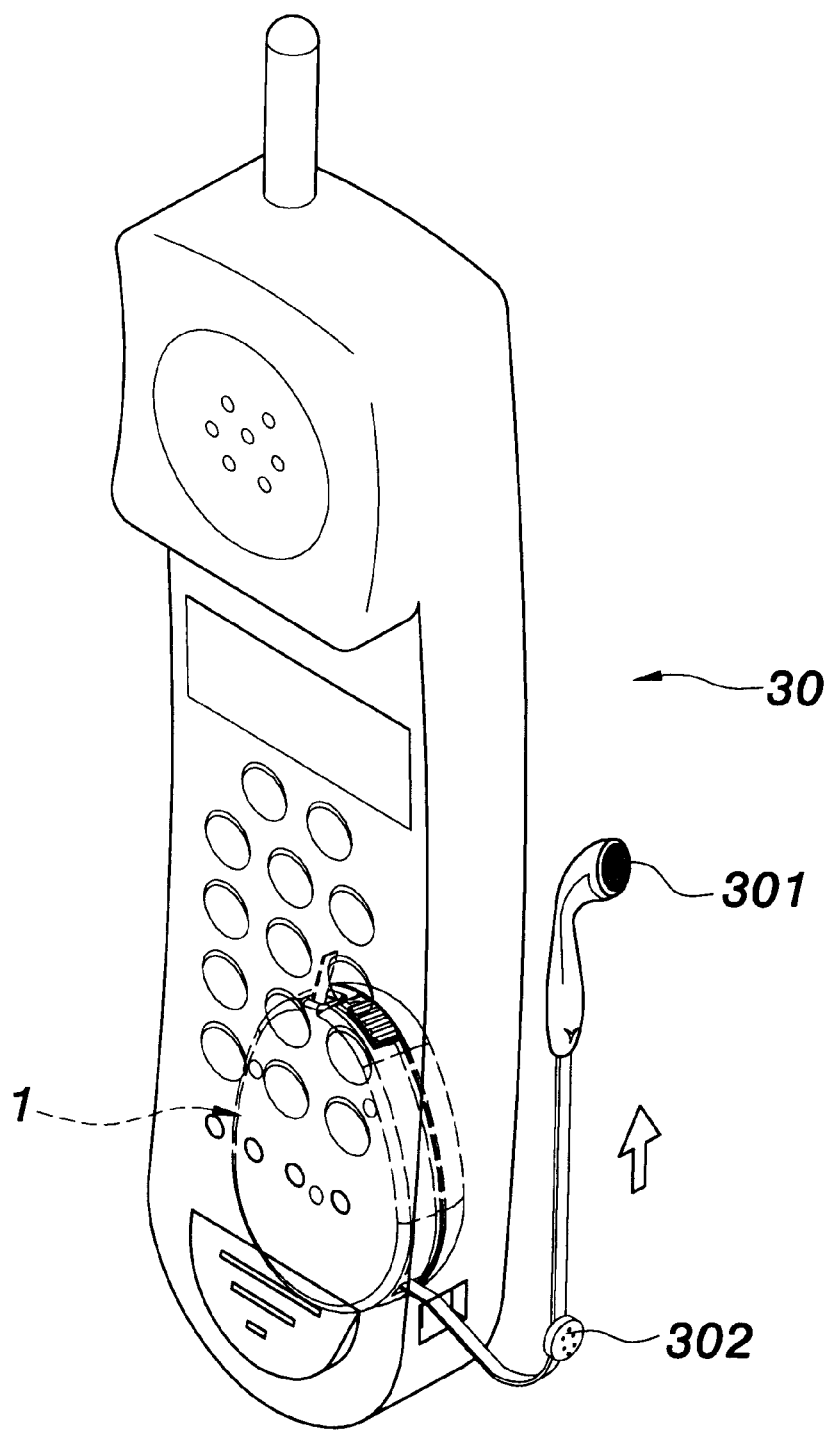
FIG. 11 is an assembled perspective view of a fifth embodiment of the present invention.

Moreover, referring to FIG. 9, a surge absorber 7 can be installed in the present invention. The second half casing 12 of the box body 1 may be integrally formed with the surge absorber 7 (referring to FIG. 9A). Furthermore, referring to FIG. 10, the present invention can be installed within a line detector 20. As shown in FIG. 11, the present invention can be installed within a wireless phone 30. Thereby, the wireless phone 30 can be easily used with an earphone 301 and a microphone 302.

Although the present invention has been described with reference to the preferred embodiments, it will be understood that the invention is not limited to the described details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wire winding box with an increasing usable area comprising:

a box body having a receiving space therein, the box body having a perimeter edge portion with a pair of spaced wire holes formed therethrough;

a wire winding disk having a first disk body and a second disk body coupled together, the first disk body having an axial hole and a wire winding shaft extending from one side thereof and a receiving groove on an opposing side of the first disk body extending between the first disk body and the second disk body, the wire winding disk being installed in the receiving space of the box body;

a communication wire having a first end portion passing through a first of the pair of wire holes and being wound around the wire winding shaft to form an inner coiled portion, a second end portion of the communication wire passing through a second of the pair of wire holes and the first disk body of the wire winding disk and being wound in the receiving groove to form an outer coiled portion;

a spiral spring connected between the box body and the wire winding disk; and, a buckling button slidably mounted to the box body adjacent one of the pair of wire holes, the buckling button having a buckling portion on one end thereof for selectively abutting against a respective portion of the communication wire and thereby secure the communication wire against displacement responsive to the buckling button being displaced in a first direction, the first direction being toward the adjacent wire hole, whereby only one communication wire portion can then be withdrawn from the wire winding disk and rewound thereon, the communication wire being freed from the securement responsive to selective displacement of the buckling button in a second direction, the second direction being opposite the first direction.

2. The wire winding box with an increasing usable area as claimed in claim 1, wherein an inner lateral side of the receiving space of the box body is installed with a shaft, and an opposite lateral side is installed with a sleeve for being inserted and positioned by one end of the shaft, the wire wind disk has an axial hole; by pivotally installing the axial hole to the shaft, the wire wind disk is pivotally installed to the receiving space of the wire wind disk.

3. The wire winding box with an increasing usable area as claimed in claim 1, wherein the receiving space of the box body has a supporting seat so that the spiral spring is received between the supporting seat and the box body.

4. The wire winding box with an increasing usable area as claimed in claim 1, wherein at least one positioning unit is formed at a periphery of a bottom of the wire winding shaft of the wire wind disk and the positioning unit has a round shape or a cylindrical shape.

5. The wire winding box with an increasing usable area as claimed in claim 1, wherein the first disk body of the wire winding disk has a through hole, the through hole penetrates through two surfaces of the first disk body, and the communication wire wound around the wire winding shaft passes through the through hole and then is wound around the receiving groove.

6. The wire winding box with an increasing usable area as claimed in claim 1, wherein an elastic retainer is installed on the wire winding disk, and the elastic retainer is installed with a buckling hole; and a buckling end of the spiral spring is installed to the buckling hole of the wire wind disk.

7. The wire winding box with an increasing usable area as claimed in claim 1, wherein a helical connecting portion is formed between the inner coiled portion and outer coiled portion.

* * * * *